Sept. 11, 1962     I. FEUER     3,053,413
DEVICE FOR RUPTURING GLASS SEALS
Filed March 13, 1961
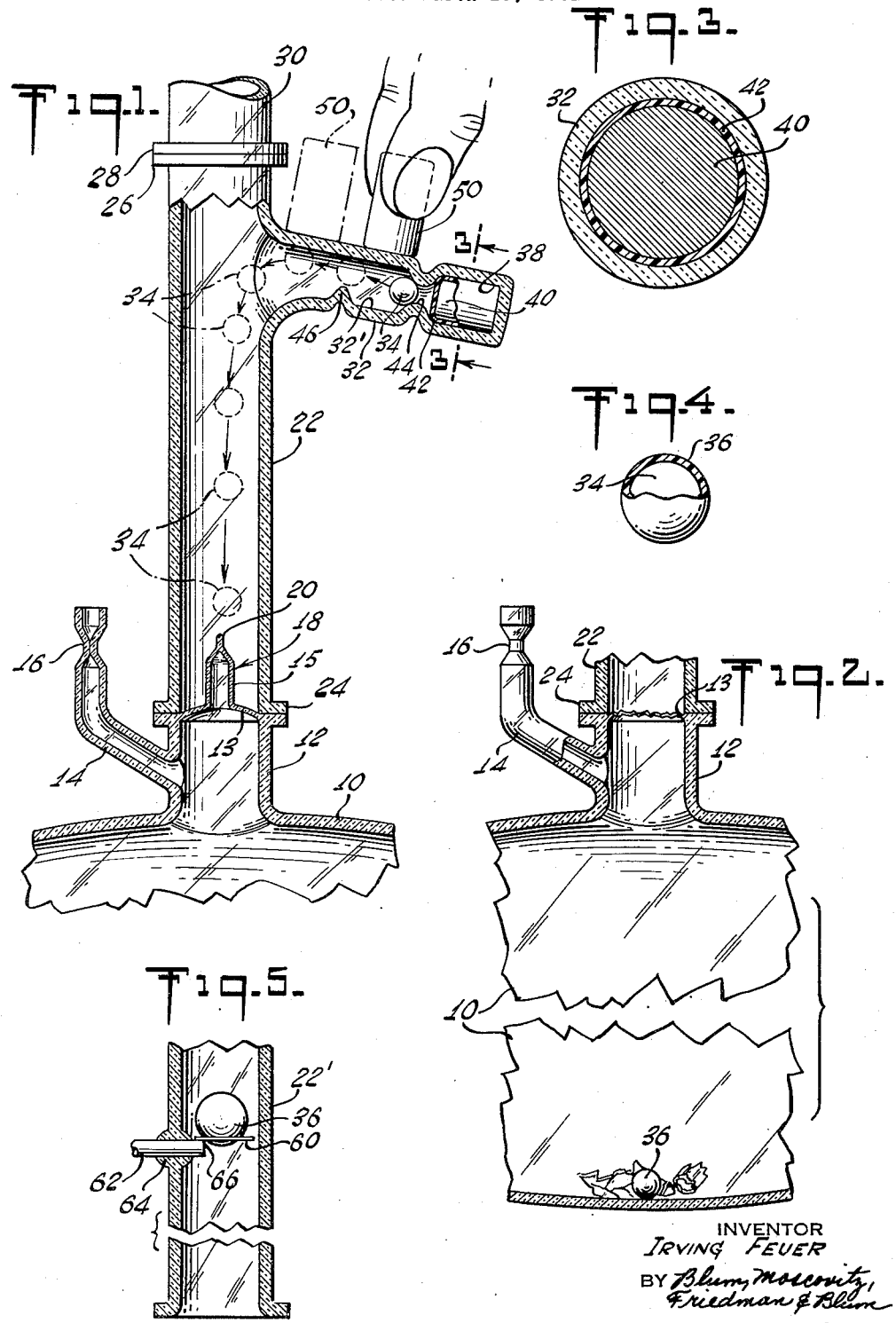
INVENTOR
IRVING FEUER
BY Blum, Moscovitz,
Friedman & Blum
ATTORNEYS

United States Patent Office 3,053,413
Patented Sept. 11, 1962

3,053,413
DEVICE FOR RUPTURING GLASS SEALS
Irving Feuer, New York, N.Y., assignor to Canrad Precision Industries, New York, N.Y., a corporation of New York
Filed Mar. 13, 1961, Ser. No. 95,367
15 Claims. (Cl. 222—5)

This invention relates generally to a device and technique for rupturing glass seals and, more particularly, to a device for rupturing glass seals of a sealed container of an ultra-pure gas.

In the art of rupturing seals in an ultra-pure gas system, glass enclosed magnets or magnetic materials have heretofore been used by burdensome and time-consuming manipulation thereof into an elevated position with respect to the seal and at best, this task is inherently difficult and inconvenient and such difficulty is compounded by the requirement that such magnet be installed and manipulated in an evacuated gas sealed system. The gas system associated with the pure gas source must be evacuated and only on evacuation is the glass seal ruptured and the heretofore used rupturing arrangement has been characterized by the use of such glass encased magnets, magnetic materials or metals which must be manipulated into position in the sealed system.

It is accordingly an important aim and object of the present invention to provide a rupturing arrangement which obviates the disadvantages aforenoted and provides a convenient, efficient and foolproof arrangement for rupturing such glass seals. Pursuant to this object of the present invention, the rupturing device may be an integral component of the ultra-pure gas container which may be safely transported and stored, this arrangement being, in effect, a self-contained system which includes its own rupturing device. Optionally, the rupturing device may be supplied as a separate component which is integrated with the ultra-pure gas container by the glass blower at the point of use.

Another object of the present invention is the provision of a rupturing device or system of the aforenoted character which is inherently safe and convenient in use and which minimizes the dangers of gas contamination inherent in the use of prior art techniques.

Yet another object of the present invention is the provision of a rupturing device or system which is completely self-contained and provides for the facile and quick evacuation of the system and rupturing of the glass seal of the gas container to thereby improve and speed up laboratory techniques involving ultra-pure gas systems.

Other objects, features and advantages of the present invention will become apparent as the description thereof proceeds when considered in connection with the accompanying illustrative drawing in which:

FIG. 1 is an enlarged fragmentary front elevational view illustrating the rupturing device of the present invention, the glass seal of the container being shown intact;

FIG. 2 is a view corresponding to the lower portion of FIG. 1 after rupture of the glass seal;

FIG. 3 is an enlarged sectional view taken on the line 3—3 of FIG. 1;

FIG. 4 is a view of the rupturing element shown partially in section; and

FIG. 5 is a fragmentary front elevational view shown partly in section of another embodiment of rupturing device in accordance with the present invention.

Referring to the drawing, and more particularly to FIGS. 1 and 2 thereof, there is shown a sealed flask or container 10 formed of glass which may contain any desired gas such as ultra-pure argon, krypton, neon, etc. The sealed container 10 of ultra-pure gas includes an upstanding neck conduit 12 having a branch conduit 14 extending therefrom and communicating therewith, said branch conduit being used for the initial filling of the container 10 and being sealed at its entrance region 16 by the usual glass blowing techniques. Prior to filling the container 10, the supply conduit 14 defines a through passage and after the filling operation the supply conduit is choked off and sealed at 16 by pinching the adjacent walls into sealing engagement with the glass in a molten state. The neck of the container is sealed by glass seal 18 which is integral with the walls of neck 12, the glass seal having a diaphragm 13 and a central, hollow, elongated formation 15 having a terminal part 20 which is formed by pinching the walls of formation 15 in a molten condition as well known to those skilled in the art. The glass seal 18 is, in effect, a frangible sealing diaphragm and in use the gas sealed in container 10 is released by rupturing the glass seal so as to define an outlet therefor. The flask 10 having branch filling conduit 14 and glass seal 18 is basically conventional, the invention herein residing in the rupturing device and technique for breaking the glass seal 18 as will now be described in detail.

Secured to the neck defining conduit and upstanding therefrom is a conduit 22 of a corresponding diameter, said conduit 22 being sealed to the neck 12 by a flange connection as indicated at 24, the flange connection being achieved by any well known glass blowing technique. It will be understood that conduit 22 may be secured to neck 12 in sealing relation therewith by any desired type of connection and the adjacent peripheral edges of conduit 22 and neck 12 may be secured directly to each other without the use of flanges thereat. The upper end of conduit 22 is provided with a peripheral flange or collar 26 which is sealed to a companion flange 28 of conduit 30, the latter communicating with the gas system. Thus the conduit 30 may form a part of a supply manifold for any desired gas utilization system.

Laterally projecting from an upper region of conduit 22 is a branch conduit 32 which defines a support for the weighted rupturing element 34, formed of steel or any other suitable magnetizable material, which is adapted to rupture the seal 18. The branch conduit 32 is downwardly inclined with respect to the conduit 22 and forms an acute angle therewith as will be apparent from FIG. 1. The element 34 may be any suitable weighted element and in the illustrated embodiment said element is of spherical configuration and is sealed in a Teflon coating 36 as shown in FIG. 4. The terminal end of branch conduit 32 defines a pocket 38 in which there is captured a magnet 40 of cylindrical configuration, said magnet being sealed in a Teflon coating 42. At the inner side of the magnet 40 the branch conduit has a restricted throat portion 44 which is of a diameter substantially less than the diameter of element 34 and the latter is releasably magnetically retained in the position shown in FIG. 1 by magnet 40. Thus the magnet 40 is sealed in its pocket 38 at its inner end by the pinched walls of the branch conduit 32 which define the restricted throat 44.

The branch conduit 32 is provided with an inwardly projecting abutment 46 disposed at the side of element 34 opposite to magnet 40 to releasably confine said element in the branch conduit 32 and more particularly in the portion 32′ thereof. The abutment 46 is defined by inwardly depressing a wall portion of conduit 32 and forms a safety feature in confining the rupturing element 34 as even when the latter is released from the magnet 40 it must be carried over the abutment 46 before it will be released for gravitation down the conduit 22. Thus the element 36 will be magnetically held in the position shown in FIG. 1 and will be restrained in the passage 32′ to the right of abutment 46 as shown in FIG. 1.

It will be understood that the inner pole face of the magnet 40 will be in close proximity to the element 34 and will magnetically maintain such element in a remote elevated position in the branch conduit 32. The element 34 is releasable from the supporting magnet 40 by an external magnet 50 which is of sufficient field strength to overcome the field strength of magnet 40 so as to release said element and carry the same over the projection 46 for gravitational movement down the conduit 22 into impact with the seal 18 for rupturing the same.

In practice, the conduits 22 and 30 and the gas system in communication therewith will be evacuated in any well-known manner and in this regard it will be appreciated that both the magnet 40 and element 34 are sealed in Teflon so as to inhibit contamination of the sealed system. Subsequent to system evacuation an external magnet 50 of requisite field strength will be manipulated into proximity with the element 34 at the branch conduit, as shown in FIG. 1, so as to release the element 34 from magnetic attraction to the magnet 40. It will be understood that the magnet 50 is of sufficient field strength to overcome the magnetic force of the magnet 40 exerted on element 34 and on release of the element 34 from magnet 40, magnet 50 is manipulated along branch conduit 32 to carry said element over the obstruction 46 as illustrated in broken lines in FIG. 1 to free said element for gravitation down the conduit 22 and into impact with the seal 18 for rupturing the same, the condition of rupture being illustrated in FIG. 2. It will be understood that the element 34 and the fragmentary portions of the now ruptured glass seal may lie at the bottom of the container or remain at the break seal itself, and the gas of the container will be released for flow through the conduits 22 and 30 and into the system in communication therewith. It will be understood that it is only necessary to rupture the seal which is accomplished by the gravitation of element 34, which may remain at the now ruptured seal or drop to the bottom of the container.

The conduit 22 and the glass seal rupturing device may be supplied as an integral part of the container 10 or, if desired, may be supplied as a separate component which is integrated with the container 10 at the point of use by well-known glass blowing techniques. The container 10 having such glass seal rupturing device may be transported and stored with safety in view of the magnetic retention of the element 34 in position coupled with the safety feature provided by the abutment 46 and the disposition of the branch 32 in which the element 34 is gravitationally biased in a direction away from the main conduit 22. This arrangement is thus a self-contained system including its own rupturing device so that in use it is merely necessary to evacuate the system and manipulate an external magnet 50 to effect the release of the element 34 and the movement thereof along the branch conduit 32 into the channel defined by the conduit 22. Thus the above-described rupturing arrangement provides a convenient, efficient and foolproof technique for rupturing glass seals or diaphragms of a sealed container.

With reference to FIG. 5 there is shown another embodiment of the present invention in which the conduit 22' may be a separate attachment component for the container 10 or may be supplied as an integral unit with said container. In FIG. 5, the conduit 22' is shown as an attachment component which is adapted for sealing integration with a container, such as container 10 having glass seal 18. In order to support the element 34 in elevated position in the channel defined by the conduit 22', there is provided a support element 60 which extends transversely of such channel substantially along the diametrical axis thereof. The support 60 is formed of a magnetizable material and is illustrated as being of filamentary construction, said element being movable out of its normal element supporting position away from the diametrical axis of the channel by means of an external magnet in order to free the element 34 for gravitational movement into the impact with the seal 18 in the manner described above. The element 34 corresponds in all respects to the correspondingly numbered element previously described and is preferably of a diameter greater than one-half the diameter of the channel defined by conduit 22'. The support 60 of magnetizable material may be of ribbon or wire formation or may be of any desired convoluted form such as of helical or coiled configuration. It will be understood that the support element 60 is dimensionally of a relatively fine construction (with requisite supporting strength) in order to permit the same to be magnetically displaced to one side of the channel so as to free the element 34 for gravitation down the channel. In this connection it is also within the scope of the present invention to oscillate the externally disposed magnet so as to rupture the support 60 at its bending point and thereby release the element 34.

In order to anchor the support 60 to the wall of conduit 22' there is provided an anchoring element for the support 60 which is constituted by a tungsten element 62 extending through the wall of the conduit 22' and sealed thereat as indicated at 64, the inner end of support 60 being secured to the adjacent end of anchoring element 62 as indicated at 66 in any desired manner such as by welding. The magnetizable material support 60 of the instant embodiment cannot be directly sealed to the glass of the conduit 22' and accordingly such support is secured in position in the channel through the interponent 62. It will be understood that once the system associated with conduit 22' is evacuated, the seal 18 disposed below such conduit is ruptured by manipulating an external magnet, such as magnet 50, adjacent the support 60 to displace the latter off-center in the channel defined by conduit 22' so as to release the element 34 for gravitation down the channel into impact with the seal 18. It will be understood that the element 34 in connection with the embodiment of FIG. 5 may be formed of a nonmagnetizable material if so desired.

From the above it will be apparent that the above-described seal rupturing devices are completely self-contained and safely provide for the facile and rapid evacuation of the system and rupture of the glass seal so as to greatly improve and speed-up laboratory techniques involving the use of ultra-pure gas.

While specific embodiments of the invention have been shown and described in detail to illustrate the application of the principles of the invention, it will be understood that the invention may be embodied otherwise without departing from such principles, and that the invention should be broadly construed in accordance with such principles.

Having thus described my invention, what I claim and desire to secure by Letters Patent is:

1. A glass conduit having a glass seal interposed therein, and means for rupturing said glass seal comprising a weighted rupturing element spaced above said glass seal, and means for supporting said element in said elevated position, said element being releasable from said support by magnetic means to free said element for gravitational movement down said conduit and into impacting engagement with said seal for rupturing the same.

2. A sealed container for an ultra-pure gas having a glass conduit upstanding therefrom provided with a glass seal, and means for rupturing said glass seal comprising a weighted rupturing element elevated from said seal and releasable for travel, down said conduit, and barrier means for obstructing said element from movement from said elevated position, said element being releasable from said barrier by magnetic means to release said element for gravitational movement down said conduit into impact with said seal for rupturing the same.

3. A sealed container for an ultra-pure gas having a glass conduit upstanding therefrom provided with a glass seal, and means for rupturing said glass seal comprising a weighted rupturing element elevated from said seal and releasable for travel, down said conduit, and barrier means for obstructing said element from movement from said elevated position, said element being releasable from said barrier by magnetic means to release said element for gravitational movement down said conduit into impact with said seal for rupturing the same, said element being encased in Teflon.

4. A glass conduit having a glass seal interposed therein, and means for rupturing said glass seal comprising a weighted rupturing element of magnetizable material elevated from said glass seal, means for supporting said element in said elevated position including magnetic means of predetermined field strength in proximity to said element, said element being releasable from said supporting means by magnetic means overcoming said first-mentioned magnetic means to free said element for gravitational movement down said conduit into impact with said seal for rupturing the same.

5. A glass conduit having a glass seal interposed therein, and means for rupturing said glass seal comprising a weighted rupturing element of magnetizable material elevated from said glass seal, means for supporting said element in said elevated position including magnetic means of predetermined field strength in proximity to said element, said element being releasable from said supporting means by magnetic means overcoming said first-mentioned magnetic means to free said element for gravitational movement down said conduit into impact with said seal for rupturing the same, said conduit upstanding from a sealed container of ultra-pure gas.

6. A glass conduit having a glass seal interposed therein, and means for rupturing said glass seal comprising a weighted rupturing element of magnetizable material elevated from said glass seal, said element being disposed in a branch conduit communicating with said glass conduit, a magnet of predetermined field strength sealed in said branch conduit in proximity to said element for releasably retaining the latter in position, said element being releasable from said magnet by an external magnet overcoming said predetermined field strength of said sealed magnet to free said element for movement from said branch conduit into said glass conduit and for gravitation into impact with said seal for rupturing the same.

7. A glass conduit having a glass seal interposed therein, and means for rupturing said glass seal comprising a weighted rupturing element of magnetizable material elevated from said glass seal, said element being disposed in a branch conduit communicating with said glass conduit, a magnet of predetermined field strength sealed in said branch conduit in proximity to said element for releasably retaining the latter in position, said element being releasable from said magnet by an external magnet overcoming said predetermined field strength of said sealed magnet to free said element for movement from said branch conduit into said glass conduit and for gravitation into impact with said seal for rupturing the same, said branch conduit having an inwardly projecting abutment disposed at the side of said element in proximity to said glass conduit to restrain the movement of said element from said branch conduit, the latter at said abutment defining a passage slightly larger than the overall dimensions of said element to permit the latter to be carried over said abutment by said external magnet.

8. A glass conduit having a glass seal interposed therein, and means for rupturing said glass seal comprising a weighted rupturing element of magnetizable material elevated from said glass seal, said element being disposed in a branch conduit communicating with said glass conduit, a magnet of predetermined field strength sealed in said branch conduit in proximity to said element for releasably retaining the latter in position, said element being releasable from said magnet by an external magnet overcoming said predetermined field strength of said sealed magnet to free said element for movement from said branch conduit into said glass conduit and for gravitation into impact with said seal for rupturing the same, said magnet being disposed at one side of said element, and abutment means disposed in said branch conduit at the opposite side of said element defining a restricted passage in said branch conduit of a size to accommodate said element.

9. A glass conduit having a glass seal interposed therein, and means for rupturing said glass seal comprising a weighted rupturing element of magnetizable material sealed in Teflon elevated from said glass seal, said element being disposed in an integral branch conduit communicating with said glass conduit, a magnet of predetermined field strength secured in position in said branch conduit in proximity to said element for releasably magnetically retaining the latter in position, said element being releasable from said magnet by an external magnet overcoming said predetermined field strength of said sealed magnet to free said element for movement from said branch conduit into said glass conduit and for gravitation into impact with said seal for rupturing the same, said glass conduit upstanding from a sealed container of an ultra-pure gas.

10. A glass conduit having a glass seal interposed therein, and means for rupturing said glass seal comprising a weighted rupturing element of magnetizable material disposed in said conduit and elevated from said glass seal, means for supporting said element in said elevated position comprising magnetizable means projecting transversely of said conduit, said element being releasable from said supporting means by an external magnet operable on said magnetizable means to move the latter from a supporting position with respect to said element for gravitational movement of the latter down said conduit into impact with said seal for rupturing the same.

11. A glass conduit having a glass seal interposed therein, and means for rupturing said glass seal comprising a weighted rupturing element of magnetizable material disposed in said conduit and elevated from said glass seal, means for supporting said element in said elevated position comprising magnetizable means projecting transversely of said conduit, said element being releasable from said supporting means by an external magnet operable on said magnetizable means to move the latter from a supporting position with respect to said element for gravitational movement of the latter down said conduit into impact with said seal for rupturing the same, said conduit upstanding from a sealed container of ultra-pure gas.

12. A glass conduit having a glass seal interposed therein, and means for rupturing said glass seal comprising a weighted rupturing element of magnetizable material disposed in said conduit and elevated from said glass seal, means for supporting said element in said elevated position comprising magnetizable means projecting transversely of said conduit, said element being releasable from said supporting means by an external magnet operable on said magnetizable means to move the latter from a supporting position with respect to said element for gravitational movement of the latter down said conduit into impact with said seal for rupturing the same, said element being sealed in Teflon and having an overall diameter greater than one-half of the diameter of said conduit.

13. A glass conduit having a glass seal interposed therein, and means for rupturing said glass seal comprising a weighted rupturing element of magnetizable material disposed in said conduit and elevated from said glass seal, means for supporting said element in elevated position comprising a magnetizable support extending transversely of said conduit and means for anchoring said support to a wall portion of said conduit, said element being releasable from said support by an external magnet having its field strength operable on said support to displace the latter from a supporting position to release said element for gravitation into impact with said seal.

14. A glass conduit having a glass seal interposed therein, and means for rupturing said glass seal comprising a weighted rupturing element of magnetizable material disposed in said conduit and elevated from said glass seal, means for supporting said element in elevated position comprising a magnetizable support extending transversely of said conduit and means for anchoring said support to a wall portion of said conduit, said element being releasable from said support by an external magnet having its field strength operable on said support to displace the latter from a supporting position to release said element for gravitation into impact with said seal, said anchoring means comprising a tungsten element sealed to said conduit at said wall portion thereof.

15. A glass conduit having a glass seal interposed therein, and means for rupturing said glass seal comprising a weighted rupturing element of magnetizable material disposed in said conduit and elevated from said glass seal, means for supporting said element in elevated position comprising a magnetizable support extending transversely of said conduit and means for anchoring said support to a wall portion of said conduit, said element being releasable from said support by an external magnet having its field strength operable on said support to displace the latter from a supporting position to release said element for gravitation into impact with said seal, said support being constituted by a filament extending substantially diametrically of said conduit in the element supporting position thereof.

References Cited in the file of this patent
UNITED STATES PATENTS

| 2,419,112 | Brandt | Apr. 15, 1947 |
| 2,576,168 | Allen | Nov. 27, 1951 |

FOREIGN PATENTS

| 744,858 | Great Britain | Feb. 15, 1956 |